No. 716,998. Patented Dec. 30, 1902.
A. C. FOOT.
LOCK NUT.
(Application filed Aug. 5, 1902.)
(No Model.)
Fig 1 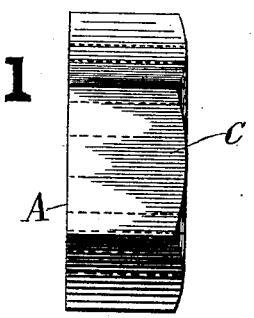 Fig 2
Fig 3 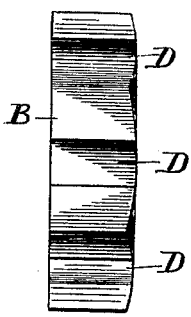 Fig 4
Fig 5
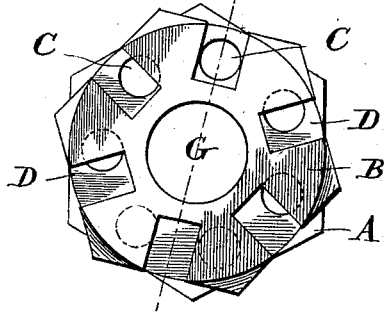
Fig 6
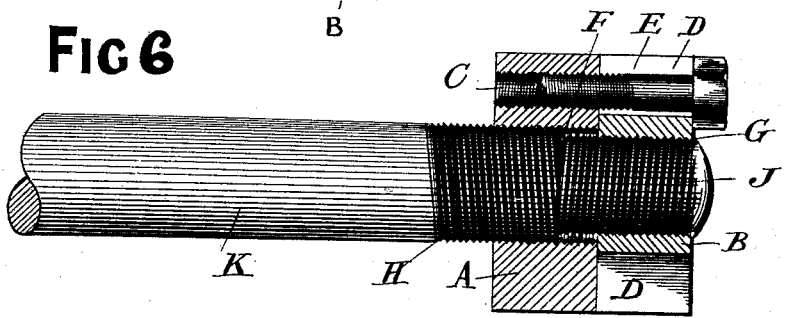
WITNESSES: 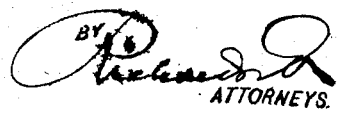
INVENTOR.
Albert Charles Foot.
BY
ATTORNEYS.

UNITED STATES PATENT OFFICE.

ALBERT CHARLES FOOT, OF SOUTHEND, ENGLAND.

LOCK-NUT.

SPECIFICATION forming part of Letters Patent No. 716,998, dated December 30, 1902.

Application filed August 5, 1902. Serial No. 118,530. (No model.)

*To all whom it may concern:*

Be it known that I, ALBERT CHARLES FOOT, a subject of His Majesty the King of Great Britain, and a resident of Sydney Villa, Pleasant road, Southend, in the county of Essex, England, have invented certain new and useful Improvements in Lock-Nuts, (for which I have made application for patent in Great Britain, No. 16,481, dated July 24, 1902, and in Belgium, No. 131,034, dated July 22, 1902,) of which the following is a specification.

My invention relates to improvements in connection with lock-nuts for fish-plate and other bolts, cycle-spindles, and the like; and it consists of a front nut or nut proper and a back or supplementary nut, the former having a circle of suitably-disposed internally-threaded circular holes or apertures of even or uneven number and the latter being provided with any number of radial slots or recesses, one of which said slots is adapted to coincide with one of the said threaded holes in the front nut and permit an externally-threaded bolt to be screwed therein for locking the nuts in position upon a bolt or the like and effectually prevent them slacking back through vibration or other cause, the said nuts having internally-threaded bolt-holes of different hands, one engaging with a right-handed and the other with a left-handed thread formed upon the said bolt, cycle-spindle, or the like for this purpose.

To enable my invention to be more readily understood, I have hereunto appended a sheet of drawings, in which—

Figure 1 is a side elevation, and Fig. 2 a front elevation, of the front nut or nut proper. Figs. 3 and 4 are similar views to Figs. 1 and 2, illustrating the back or supplementary nut. Fig. 5 is a front elevation of the front and back nuts when superposed and in position ready for locking. Fig. 6 is a sectional side elevation taken upon the line A B of Fig. 5, illustrating the nuts when locked in position upon a bolt or the like.

In carrying my invention into effect I provide a front or inner nut A and a back or outer nut B of hexagonal, square, or other configuration. In the front or inner nut are formed a series of parallel threaded holes C, equally spaced around a circle concentric with the nut-aperture. These holes may extend wholly or partially through the nut, and in the back or outer nut B are formed a series of radial slots D, arranged in a circle concentric with the nut-aperture and in number being one less than the number of holes C in inner nut A. When the nut B is screwed down on the nut A, one of the slots D will coincide with one of the holes C and permit an externally-threaded retaining-bolt E to be screwed into engagement with the said hole C.

Both the front and back nuts A B are respectively adapted by means of the usual internally-threaded bolt-holes F G to engage with right and left handed external threads H and J, formed upon the end of a bolt, cycle-spindle, or the like K, the bolt-hole F of the front nut A being in this case necessarily of a diameter sufficiently in excess of that of the back nut B and its left-handed engaging thread J upon the end of K to insure clearance of the latter when effecting engagement between the said front nut A and the right-handed thread H of the said bolt or the like K. If now the front nut A be first screwed upon its corresponding right-handed thread H upon the bolt or the like K, as at Fig. 6, and the back nut B be then screwed upon its corresponding and left-handed thread J until both said nuts A and B are in contact and one of the slots or recesses D of the latter coincides with one of the holes or apertures C of the former, Figs. 5 and 6, the said threaded retaining-bolt E could and would be passed through the slot D of B and screwed into the hole C of A, and so effectually engage and lock both the said nuts A and B together, as any tendency (due to vibration or other cause) of either to rotate or slack back would be frustrated by reason of the rigid connection between the nuts A and B due to the presence of the connecting-bolt E.

Having now described my invention, what I claim as new, and desire to secure by Letters Patent, is—

In a nut-lock, the combination with the bolt, of an inner nut having a series of parallel threaded holes equally spaced around a circle concentric with the nut-aperture, an outer nut having a series of radial slots less by one than the holes in the inner nut and similarly arranged, and a bolt passing through a registering slot of the outer nut and threaded hole of the inner nut substantially as and for the purpose specified.

In witness whereof I have hereunto set my hand in presence of two witnesses.

ALBERT CHARLES FOOT.

Witnesses:
HENRY CONRAD HEIDE,
GEORGE THOMAS HYDE.